US010131997B2

United States Patent
Johansen et al.

(10) Patent No.: US 10,131,997 B2
(45) Date of Patent: Nov. 20, 2018

(54) METHOD FOR THE PRODUCTION OF GRAPHITE BODIES

(75) Inventors: Johan Arnold Johansen, Kristiansand S (NO); Sten Yngve Larsen, Kristiansand S (NO); Hermann Gran, Kristiansand S (NO)

(73) Assignee: ELKEM CARBON AS, Oslo (NO)

( * ) Notice: Subject to any disclaimer, the term of this patent is extended or adjusted under 35 U.S.C. 154(b) by 465 days.

(21) Appl. No.: 13/574,101

(22) PCT Filed: Jan. 18, 2011

(86) PCT No.: PCT/NO2011/000016
§ 371 (c)(1),
(2), (4) Date: Aug. 28, 2012

(87) PCT Pub. No.: WO2011/090388
PCT Pub. Date: Jul. 28, 2011

(65) Prior Publication Data
US 2013/0004410 A1   Jan. 3, 2013

(30) Foreign Application Priority Data

Jan. 19, 2010  (NO) .................................. 20100098

(51) Int. Cl.
C25C 3/06   (2006.01)
C25C 3/08   (2006.01)
(Continued)

(52) U.S. Cl.
CPC .............. *C25C 3/08* (2013.01); *C04B 35/522* (2013.01); *C04B 35/532* (2013.01); *C25C 7/02* (2013.01);
(Continued)

(58) Field of Classification Search
CPC ........... C25C 3/08; C25C 7/02; C04B 35/522; C04B 35/532; C04B 2235/722;
(Continued)

(56) References Cited

U.S. PATENT DOCUMENTS 4,288,407 A   9/1981 Markel
4,308,177 A   12/1981 Tucker
(Continued)

FOREIGN PATENT DOCUMENTS

EP   0975926 B1   7/2002
GB   789663 A    1/1958
GB   1586312 A   3/1981

OTHER PUBLICATIONS

Belitskus, D. "Effects of anthracite calcination and formulation variables on properties of bench scale aluminum smelting cell cathodes", Metallurgical Transactions B, Dec. 1997, vol. 8B, pp. 591-596, tables III, IV p. 593 last paragraph, abstract.

*Primary Examiner* — Richard M Rump
(74) *Attorney, Agent, or Firm* — Lucas & Mercanti, LLP

(57) ABSTRACT

The present invention relates to a method for production of graphite bodies. Carbon bodies are formed from a mixture of electric calcined coke particles calcined at a temperature between 1200 and 3000° C. and a binder where the coke particles have sulphur-and nitrogen content varying between 0 and 1.5% by weight and where the coke particles have an average sulphur content less than 0.6% by weight and a nitrogen content of less than 0.6% by weight, baking of the carbon bodies at a temperature between 700 and 1400° C. and graphitizing of the baked carbon bodies at a temperature above 2300° C.

10 Claims, 2 Drawing Sheets

(51) Int. Cl.
*C04B 35/52* (2006.01)
*C04B 35/532* (2006.01)
*C25C 7/02* (2006.01)

(52) U.S. Cl.
CPC .. *C04B 2235/656* (2013.01); *C04B 2235/722* (2013.01); *C04B 2235/726* (2013.01); *C04B 2235/77* (2013.01)

(58) Field of Classification Search
CPC .......... C04B 2235/77; C04B 2235/656; C04B 2235/726; C04B 2235/756; C01B 31/04; C01B 32/205
USPC ................................................ 423/448, 460
See application file for complete search history.

(56) References Cited

U.S. PATENT DOCUMENTS 6,157,667 A * 12/2000 Johansen et al. ............. 373/115
2008/0003167 A1 1/2008 Miller

* cited by examiner

METHOD FOR THE PRODUCTION OF GRAPHITE BODIES

CROSS-REFERENCE TO RELATED APPLICATIONS

This application is a 371 of PCT/NO2011/000016 filed Jan. 18, 2011, which in turn claims the priority of No. 20100098 filed Jan. 19, 2010, the priority of both applications is hereby claimed and both applications are incorporated by reference herein.

TECHNICAL FIELD

The present invention relates to production of graphite bodies.

BACKGROUND ART

By conventional production of graphite bodies it is used gas calcined coke. Gas calcined petrol coke contains varying amount of sulphur, typical 0.4-4%. Gas calcined coke particles with a selected particle size distribution are mixed with tar/pitch binder, formed whereafter the bodies are baked at 850-950° C. Thereafter the baked bodies are graphitized in conventional graphitizing furnaces at a temperature in the range of 2300-3300° C. During the graphitizing process sulphur will be released from the coke at a temperature in the range of 1400-2000° C. This is known as "sulphur puffing" and will result in an irreversible thermal expansion of the carbon body which in turn will result in increased porosity, lower density and lower electric and thermal conductivity in the graphite bodies.

It is known to counteract the effect of sulphur puffing during production of graphite bodies by addition of sulphide forming compounds such as $Fe_2O_3$, $CaN_2$ and $Na_2CO_3$. Other salts or oxides of sulphide forming metals such as manganese, aluminium, zinc and copper have also been used. The addition of such compounds can however have other negative influence on the properties of the produced graphite bodies.

Also nitrogen content in coke, particularly pitch coke, can give rise to puffing during heat treatment in the range of 1400-2100° C. Addition of $Cr_2O_3$, CoO, NiO and boric acid have shown to effectively reduce the effect of nitrogen puffing.

In order to reduce the porosity and increase the density the produced graphite bodies made from coke, particularly coke with high sulphur content and possibly nitrogen content, are impregnated with tar pitch under vacuum at temperatures in the range of 200-300° C. and then baked once more at a temperature of at least 750° C. If a 100% graphitizing is needed a second graphitizing step at a temperature in the range of 2300-3300° C. has to be done. If even higher density is needed it may be necessary to repeat the steps of impregnating, baking and graphitizing.

The steps of impregnating under vacuum baking and possibly renewed graphitizing are very costly.

By the present invention one have arrived at a method for production of graphite bodies where the steps of adding inhibitors to reduce the effect of sulphur and nitrogen puffing, impregnating with tar pitch and baking after the first graphitization step and a second graphitization step can be avoided and whereby graphite bodies can be obtained having as good or better properties than conventionally produced graphite bodies that are impregnated with tar pitch and subjected to baking and a second graphitization step. By the present invention it is particularly obtained graphite bodies having a high density, low open porosity and air permeability compared to conventionally graphite bodies.

DESCRIPTION OF THE INVENTION

The present invention thus relates to a method for production of graphite bodies, which method is characterized in that carbon bodies are formed from a mixture of electric calcined coke particles calcined at a temperature between 1200 and 3000° C. and a binder where the coke particles have sulphur- and nitrogen content varying between 0 and 1.5% by weight and where the coke particles have an average sulphur content less than 0.6% by weight and a nitrogen content of less than 0.6% by weight, baking of the carbon bodies at a temperature between 700 and 1400° C. and graphitizing of the baked carbon bodies at a temperature between 2300 and 3300° C.

The electric calcined coke particles preferably have an average sulphur content of less than 0.3% by weight and an average nitrogen content of less than 0.3% by weight.

The electric calcined coke particles are preferably selected among petrol coke, pitch coke, needle coke and anthracite.

As binder it is preferably used coal tar pitch, petrol pitch or a resin based binder such as for instance phenolic resin, furan resin or furfuryl alcohol.

The baking of the carbon bodies is preferably carried out at a temperature between 750 and 950° C. and the graphitizing of the baked carbon bodies are preferably carried out at a temperature between 2300 and 3000° C.

Preferably the mixture of coke particles and binder consist of 80-87% by weight of coke particles and 13-20% by weight of tar pitch or resin.

During electric calcination of coke it is possible to reduce the sulphur content in raw coke from up to 8% by weight to below 0.5 weight %. At the same time the nitrogen content is reduced to very low value (typical below 0.3% by weight). The electric calcining is preferably carried out in a calcining furnace described in EP-B 975926. During calcination according to this patent different fractions of calcined coke are discharged where the coke particles have been heated to a temperature in the range of 1200-3000° C. This temperature treatment of the coke particles results in a varying content of sulphur and nitrogen in the individual coke particles which is an important factor in order to obtain high density and good mechanical properties.

It has surprisingly been found that a varying content of nitrogen and sulphur where the coke particles contain from 0 to 1.5% by weight sulphur and nitrogen and where the average content of sulphur and nitrogen is lower than 0.6% by weight in electric calcined coke results in a minimal sulphur puffing during the graphitization process. This results in that during the graphitization process it is obtained graphite bodies with a low open porosity and high density. The steps in the conventional process of use of inhibitor for reducing puffing, impregnation with tar pitch after the graphitization process and new baking and graphitization are not necessary.

During conventional production of graphite bodies the carbon body, in addition to thermal expansion of the carbon body as a result of sulphur and/or nitrogen puffing, the carbon body will undergo a three-dimensional structural change where the carbon gradually will change towards a graphite structure. The structural change results in an increased crystal size (Lc and La) but at the same time a reduction in lattice plane distance (D002) and thereby a shrinkage of the carbon body. By the present invention the coke is less subjected to such structural change than coke that has been subjected to a uniform temperature treatment during gas calcination, due to the fact that the higher temperature which the coke particles are subjected to during electric calcination causes such structural changes already during the calcination process. This will result in that by the method of the present invention there will be induced lower stresses as a result of structural change in the carbon body during the graphitization process and thereby lower probability for crack formation. A non-uniform temperature treatment of the coke is important for the present invention.

Electric calcined coke will further have a higher thermal conductivity than gas calcinated coke. Increased thermal conductivity in unbaked state will thereby allow higher baking speed of the unbaked carbon body and thereby reduced production costs.

In addition to low porosity and high density it is also obtained other good properties such as high electric conductivity and thermal conductivity and low air permeability for the graphite bodies produced according to the present invention.

Graphite bodies produced according to the present invention are, due to low electric resistivity and low porosity, particularly suited for use as cathode blocks in electrolytic cells for the production of aluminium, but can be used for all purposes where graphite normally is used.

SHORT DESCRIPTION OF THE DRAWINGS

FIG. 1 shows appearant/geometric density for six commercial qualities of graphite is marked A-F while the density for graphite bodies produced according to the invention are shown by a dotted horizontal line. For quality A and B the density is shown both for unimpregnated graphite and for the same graphite impregnated once (1×). For quality C and D it is shown density for graphite impregnated once (1×) and for the same graphite impregnated twice (2×).

EXAMPLE

Production of Graphite Bodies

Electric calcined petrol coke calcined at a temperature between 1200 and 3000° C. having a sulphur content of 0.3% by weight was mixed with 20% by weight of tar pitch. The mixture contained 80% by weight of electric calcined petrol coke and 20% by weight of tar pitch.

The mixture was formed to a rectangular body by vibration and thereafter baked at 950° C.

The baked carbon body was thereafter graphitized in a standard graphitizing furnace at a temperature of 2300-3000° C.

Samples of the graphite body were tested for density, porosity, electric resistivity and air permeability. Electric resistivity and air permeability are dependant on the direction and values for respectively parallel and perpendicular direction of the grains were measured. The results are shown in Table 1.

TABLE 1

| Property | Unit | Parallell to grain direction | Perpendicular to the grain direction |
|---|---|---|---|
| Appearant density: | g/cm³ | 1.734 | |
| Open porosity: | % | 14.3 | |
| Electric resistivity: | µΩm | 7.7 | 9.0 |
| Air permeability: | nPm | 2.8 | 0.8 |

The results in Table 1 show that graphite bodies produced by the method according to the present invention have properties that are substantially better than for the commercial graphite bodies produced without impregnation, baking and a second graphitization after the first graphitization step.

Figure 1:
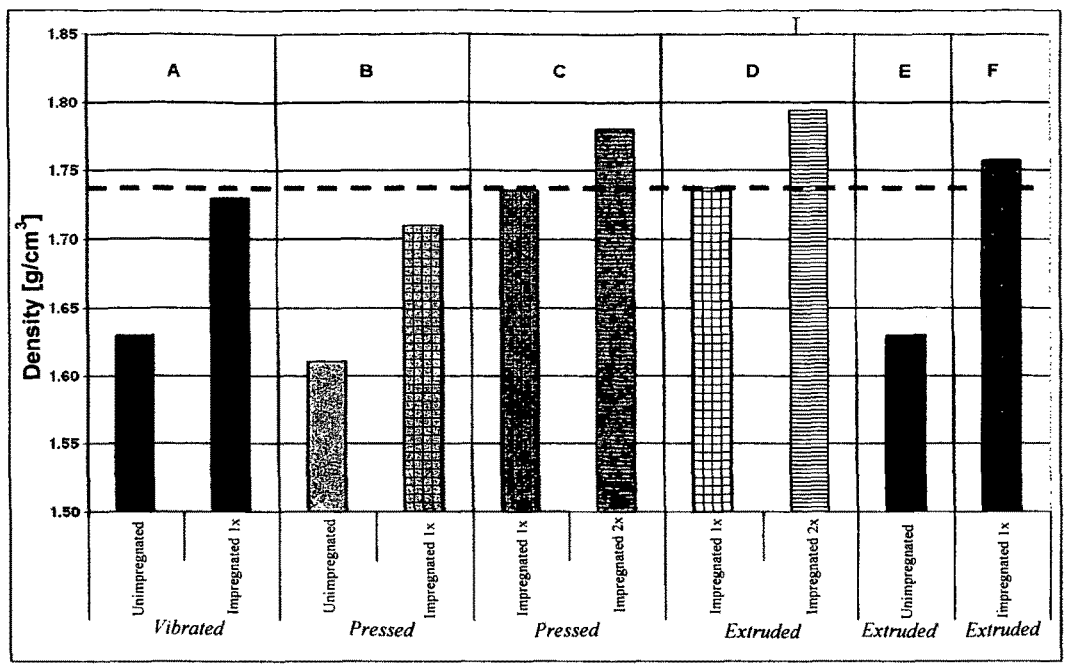

The graphite bodies produced according to the present invention have a substantially higher density than unimpregnated the commercial graphite bodies A, B and E shown in FIG. 1 and as high or higher density then the commercial graphite body A, B, C, D and F which have been impregnated once. Only the commercial graphite bodies C and D which have been impregnated twice have a significant higher density than the graphite bodies produced according to the present invention. Two times impregnation followed by baking and graphitizing have however a significant higher production costs.

Figure 2:
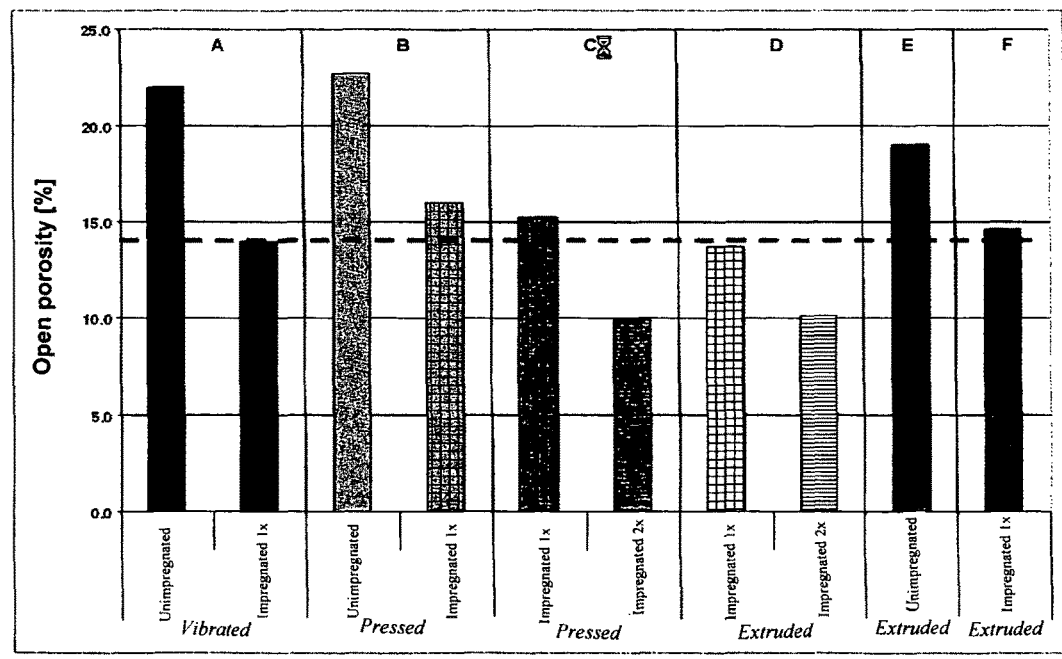
FIG. 2 shows similar diagram as shown in FIG. 1 for porosity for graphite bodies produced according to the invention (horizontal line) compared with the same six commercial graphite bodies A-F as shown in FIG. 1.

FIG. 2 shows that the graphite bodies according to the invention have a substantially lower porosity than the commercial graphite bodies A, B and E without impregnation, and as low or lower that the graphite bodies A, D and F which have been impregnated once. Only when having been impregnated twice commercial graphite bodies C and D show a porosity that is significantly better than the graphite bodies according to the invention.

Figure 3:
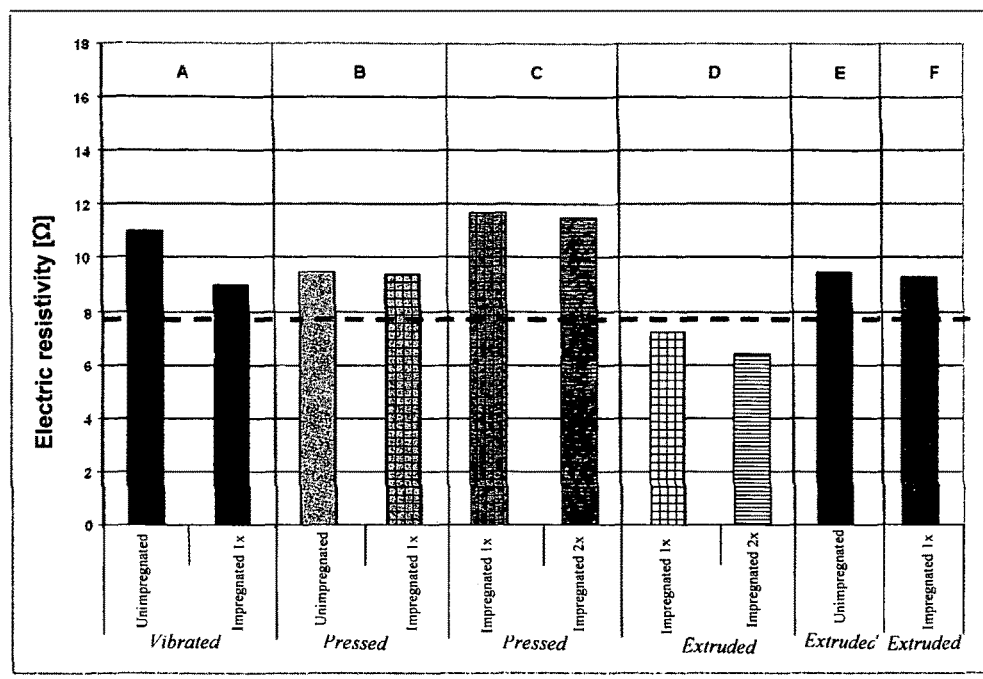
FIG. 3 shows similar diagram as shown in FIG. 1 for electric resistivity for graphite bodies produced according to the invention (horizontal dotted line) compared with the same six commercial graphite bodies A-F as shown in FIG. 1.

FIG. 3 shows that the graphite bodies according to the invention have a substantially low resistivity than all the unimpregnated commercial graphite bodies A, D, C, E and F. Only commercial graphite body D which has been impregnated once and twice has a lower electric resisitivity than the graphite bodies according to the present invention.

Figure 4:
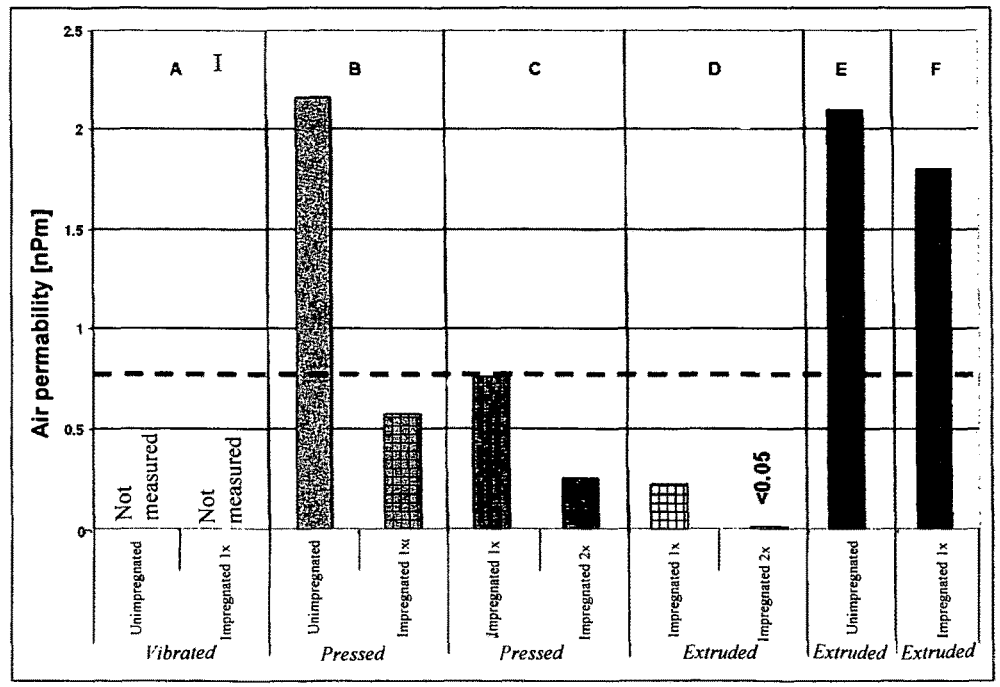
FIG. 4 shows similar diagram as shown in FIG. 1 for air permeability for graphite bodies produced according to the present invention (horizontal line) compared with the same six commercial graphite bodies A-F as shown in FIG. 1.

FIG. 4 shows that the air permeability for the graphite bodies according to the invention is substantially lower than for the unimpregnated commercial graphite bodies B and E.

The invention claimed is:

1. Method for production of graphite bodies, comprising:
    selecting electric calcined coke particles calcined in an electric calcining furnace at a non-uniform temperature between 1200 and 3000° C.;
    the selected electric calcined coke particles comprising individual coke particles vary from each other in sulfur content and in nitrogen content, the varying content of sulfur of the individual coke particles varying between 0 and 1.5% by weight, the varying content of nitrogen of the individual coke particles varying between 0 and 1.5% by weight;
    forming a mixture from the selected electric calcined coke particles, the mixture having an average sulfur content less than 0.6% by weight and an average nitrogen content of less than 0.6% by weight;
    forming carbon bodies from the mixture of the selected electric calcined coke particles and a binder;

baking the carbon bodies at a temperature between 700 and 1400° C.; and graphitizing the baked carbon bodies at a temperature above 2300° C.

2. Method according to claim 1, wherein the mixture of coke particles and binder consist of 70-90% by weight of coke particles and 10-30% by weight of binder.

3. Method according to claim 2, wherein the mixture of coke particles and hinder consist of 80-87% by weight of coke particles and 13-20% by weight of binder.

4. Method according to claim 1, wherein the binder is tar pitch, petrol pitch or a resin based binder.

5. Method according to claim 4, wherein the resin based hinder is selected among phenolic resin, furan resin and furfuryl alcohol.

6. Method according to claim 1, wherein the baking of the carbon bodies is carried out at a temperature between 700 and 900° C.

7. Method according to claim 1, wherein the graphitizing of the baked carbon bodies are carried out at a temperature above 2300° C.

8. Method according to claim 1, wherein the electric calcined coke particles have an average sulfur content of less than 0.3% by weight.

9. Method according to claim 1, wherein the electric calcined coke particles have an average nitrogen content of less than 0.3% by weight.

10. Method according to claim 1, wherein the electric calcined coke particles are selected among petrol coke, pitch coke, needle coke and anthracite.

\* \* \* \* \*